United States Patent
Erskine et al.

(10) Patent No.: US 9,204,265 B2
(45) Date of Patent: Dec. 1, 2015

(54) METHOD OF TRANSMITTING CODED MESSAGES AND PROVIDING FOR CALENDARING RESPONSES

(71) Applicants: Weusi Erskine, Pembroke Pines, FL (US); Isaac S. Daniel, Miramar, FL (US); Hortencia Daniel, Miramar, FL (US)

(72) Inventors: Weusi Erskine, Pembroke Pines, FL (US); Isaac S. Daniel, Miramar, FL (US); Hortencia Daniel, Miramar, FL (US)

( * ) Notice: Subject to any disclaimer, the term of this patent is extended or adjusted under 35 U.S.C. 154(b) by 0 days.

(21) Appl. No.: 13/682,676

(22) Filed: Nov. 20, 2012

(65) Prior Publication Data

US 2013/0231143 A1 Sep. 5, 2013

Related U.S. Application Data

(60) Provisional application No. 61/562,905, filed on Nov. 22, 2011.

(51) Int. Cl.
*H04W 4/00* (2009.01)
*H04W 4/12* (2009.01)

(52) U.S. Cl.
CPC .................................. *H04W 4/12* (2013.01)

(58) Field of Classification Search
None
See application file for complete search history.

(56) References Cited

U.S. PATENT DOCUMENTS

| | | | |
|---|---|---|---|
| 2010/0004008 A1* | 1/2010 | Abolrous et al. | 455/466 |
| 2010/0005065 A1* | 1/2010 | Lai | 707/3 |
| 2010/0125785 A1* | 5/2010 | Moore et al. | 715/702 |
| 2010/0179991 A1* | 7/2010 | Lorch et al. | 709/206 |

* cited by examiner

*Primary Examiner* — Erika A Washington
(74) *Attorney, Agent, or Firm* — Carol N. Green Kaul, Esq.

(57) ABSTRACT

The present invention relates generally to a system and method of transmitting coded messages electronically using a wireless mobile communication device to transmit coded messages identifiable by pre-programmed or programmable keys associated with icons corresponding to the coded messages being transmitted and providing for scheduling calendar events, e.g. calendared responses, which may include returning a phone call.

20 Claims, 9 Drawing Sheets

| | | |
|---|---|---|
| ⊚ Post Location | 🎧 Listening to Music | 👥 Not Available |
| 🏠 At Home | 📖 Reading | 👤+ Available |
| 🏛 At Work —120 | ⓘ Urgent | 👤 Meet Me —120" |
| 🔍 Searching | ♡ Love U —120' | 🎬 In a Movie |
| ⭐ JustSync Me | 🕯 At a Concert | 🛒 Shopping |
| 💬 Text Me | ☁ Outside | ☕ Coffee |
| ✉ Send Me Email | ⏰ Waiting | 👍 I Like It |
| ❓ Why? | ✈ On a Plane/Traveling | 👎 I Don't Like It |
| ✋ Stop Calling | ⛆ Raining | |
| ☏ Call You Back | 🥣 Lunch | |
| 📱 On A Call | 🍺 Let's Have a Drink | |
| 👥 In A Meeting | ✓ Yes | |
| 📹 Video | ✗ No | |
| 🎤 Leave a Voice Message | | |

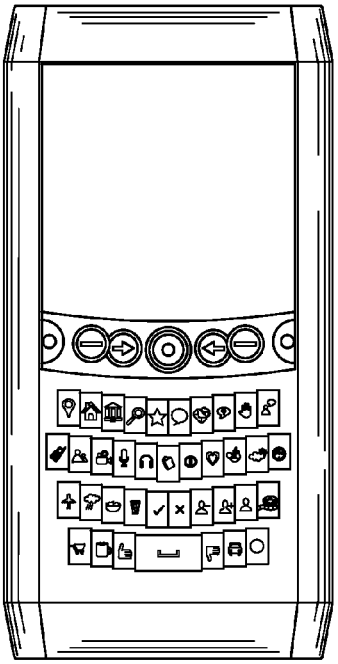

METHOD OF TRANSMITTING CODED MESSAGES AND PROVIDING FOR CALENDARING RESPONSES

PRIORITY CLAIM

This patent application is a continuation in part non-provisional patent application and claims priority under 35 U.S.C. §119(e) to: U.S. Provisional Patent Application Ser. No. 61/562,905 titled A Method Of Transmitting Coded Messages And Providing For Calendaring Events, filed Nov. 22, 2011 which is hereby incorporated by reference as if fully stated herein.

FIELD OF THE INVENTION

The present invention relates generally to a system and method of transmitting coded messages electronically using a wireless mobile communication device to transmit coded messages identifiable by pre-programmed or programmable keys associated with icons corresponding to the coded messages being transmitted and providing for scheduling calendar events, e.g. calendared responses, which may include returning a phone call.

DESCRIPTION OF THE PRIOR ART

Although we are all aware of the dangers of driving and texting, a small minority still persists in engaging in this dangerous practice either out of perceived necessity or fear of missing an important call or message. Many states have cracked down on this practice enforcing traffic laws by issuing traffic tickets, but still the problem persists. Several mobile communicating devices, e.g. cellular phones, include voice activation options for dialing or answering calls, but not all phones include this option or not all users are fully conversant with this functionality. Notwithstanding, voice activation does not necessarily solve the underlying problem of trying to communicate a short message to callers in a quick, efficient and safe manner.

Individuals also face similar challenges in varied social settings where protocol dictates that phone conversations are kept to an absolute necessity, e.g. in a meeting or in attendance at a concert. Yet in an effort not to be discourteous, many call recipients choose to answer the phone and quickly acknowledge the caller even though they may not be able to engage in a full blown conversation. Thus, it would be useful to have a system and method of transmitting short coded messages in a quick and efficient manner.

In instances where the call recipients choose not to answer the incoming call, generally there is an intent to return the call in a timely manner. However, certain unanswered calls are soon forgotten and never returned. Thus, it would be useful to have a quick and efficient system and method of reminding the call recipient to return calls in an expedient manner.

This invention satisfies these long felt needs in a new and novel manner and solves the foregoing problems that the prior art has been unable to resolve.

SUMMARY OF THE INVENTION

An object of the present invention is to provide a system and method for transmitting coded messages using a wireless mobile communication device that overcomes the limitations of the prior art.

Another object of the present invention is to provide a system and method for sending short coded messages via mobile communication devices using pre-programmed and/or programmable keys.

Yet another object of the invention is to provide the means for users to customize a coded message for a particular icon.

Another object of the invention is to provide the means for users to customize and edit the coded messages associated with particular icons.

Yet another object of the invention is to provide a system and method for correlating short coded messages with display icons which can be used to transmit at least one coded message to at least one or a plurality of electronic address.

Still yet another object of the invention is to allow users to customize the short coded messages being transmitted to communicate in a language of their choice.

Another object of the present invention is to provide a method wherein a user may selectively transmit at least one or more messages to one or a plurality of electronic address using any one or more of the pre-programmed or programmable keys.

Yet another object of the invention is to provide a calendaring system and method for incoming calls to remind call recipients of calendared responses, which may include returning a phone call.

A system is provided comprising of at least one processor and computer executable instructions readable by the at least one processor and operative to host a coded message application (herein referred to as "app") for transmitting coded messages. The app 110 may be any type of software application, such as a mobile application designed to run on a mobile platform, such as a mobile communication device running an operating system, such as IOS™, ANDROID™, WINDOWS MOBILE™, BLACKBERRY™, and the like. In another embodiment, the application program may be designed to run on a social network platform, such as FACEBOOK™ or JUSTSYNC™.

A system and method for transmitting at least one coded message comprises of: at least one mobile communication device that includes at least one processor positioned within, in electronic communication with the at least one mobile communication device's communication means; an application program comprising of computer executable instructions readable by the at least one processor, and configured to perform any one or more of the following: display at least one icon on a virtual keyboard on the mobile communication device's at least one displaying means, wherein the at least one icon corresponds to at least one coded message available for transmission to at least one electronic address via the at least one mobile communication device's communication means; receive selection of the at least one icon for transmission to the at least one electronic address; convert the selected at least one icon to a coded message; display the converted icon's coded message on the at least one displaying means; receive selection of the at least one electronic address; transmit the coded message to the at least one electronic address; or display confirmation of transmission of the coded message. The computer executable instructions readable by the computer processor are further operative to launch the coded message application for transmitting coded messages to the at least one electronic address. Electronic address may include any one or more of the following: name, telephone number, email address and social network electronic identifier. Communications means is configured for accessing a data network and transmitting electronically voice or data communications.

In some embodiments, system and method comprises of computer executable instructions readable by the computer processor configured to perform any one or more of the following: receive and publish notification of an incoming communication from a sender's electronic address on the mobile communication device's displaying means; receive selection of an icon for calendaring a response to the incoming communication; capture the sender's electronic address and generate and store a reminder message for the response that was calendared; or publish the reminder message on the mobile communication device's displaying means at predetermined intervals unless alternate instructions are received. Alternate instructions may comprise of any one or more of the following: okay, cancel, delete; and completed.

In some embodiments, system and method further comprise of computer executable instructions readable by the computer processor configured to perform any one or more of the following: receive a request to edit the coded message that corresponds to the selected at least one icon; replace a display of a virtual keyboard on the mobile communication device's displaying means that comprises of at least one icon with a virtual display of a keyboard with alphanumeric characters; receive at least one edit to the converted coded message; store the at least one edit for the converted coded message; or display an electronic address for at least one electronic address of the at least one coded message.

In some embodiments, system and method further comprises of launching an application program; activating a display of a virtual keyboard comprising of at least one or more icons on the at least one displaying means, wherein the at least one icon corresponds to at least one coded message available for transmission to at least one electronic address; receive selection of the at least one icon for transmission to at least one electronic address; convert the selected at least one icon to a coded message; display the converted icon's coded message on the mobile communication device's displaying means; receive selection of the at least one electronic address of the intended message recipients; transmit the coded message to the at least one electronic address for the message recipients; and display confirmation of transmission of the coded message. In some embodiments, user may receive an incoming transmission from one electronic address but may choose to respond to the original sender's at least one electronic address 122 or a plurality of electronic addresses 122, 122'.

For a further and more fully detailed understanding of the present invention, various objects and advantages thereof, reference is made to the following detailed description and the accompanying drawings.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

FIGS. 1A-1C are exemplary embodiments of the system according to one embodiment.

DETAILED DESCRIPTION OF PREFERRED EMBODIMENTS

Figure 1A:
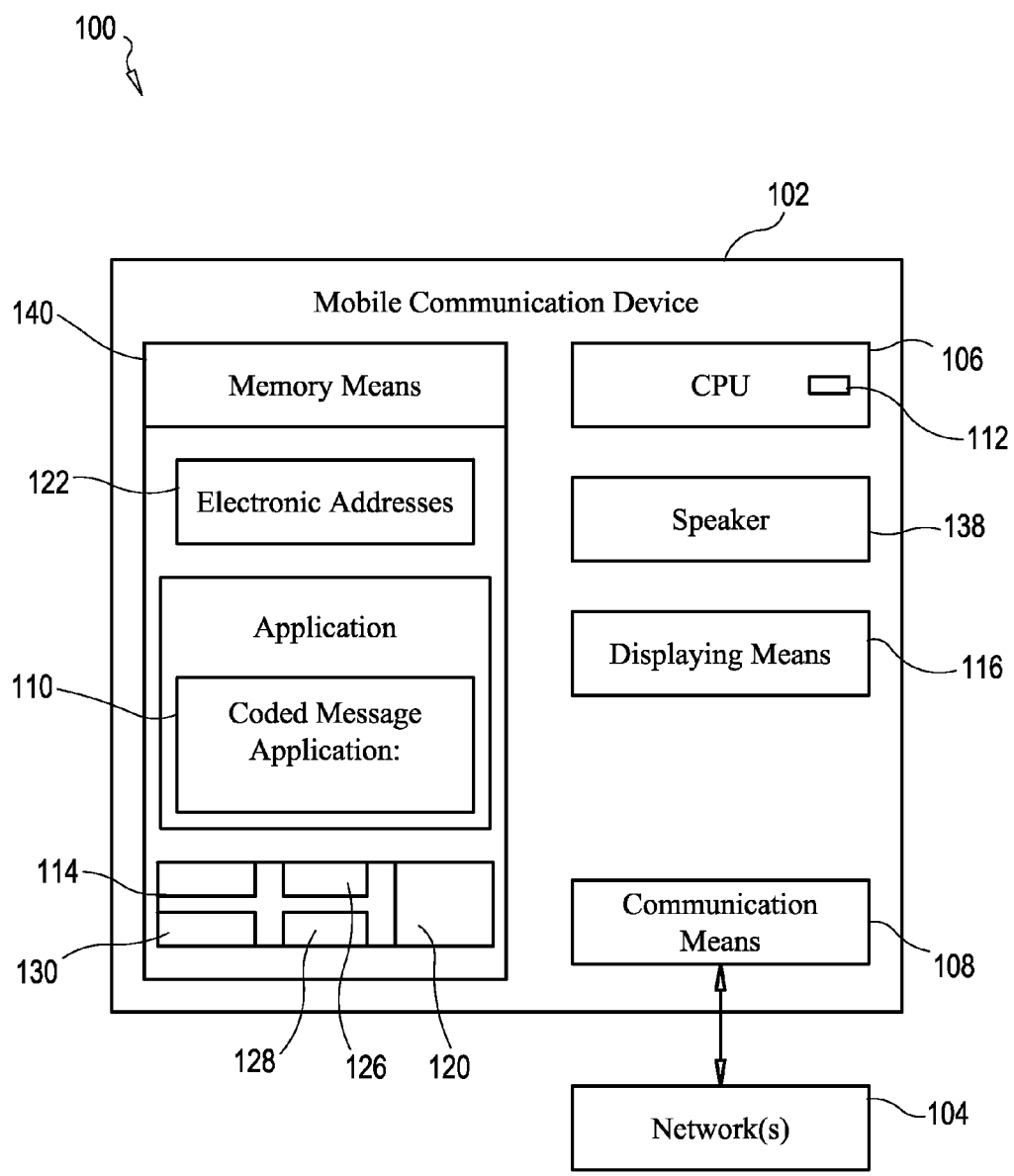

The following discussion describes in detail an embodiment of the various methods for transmitting coded messages as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems

Figure 1B:
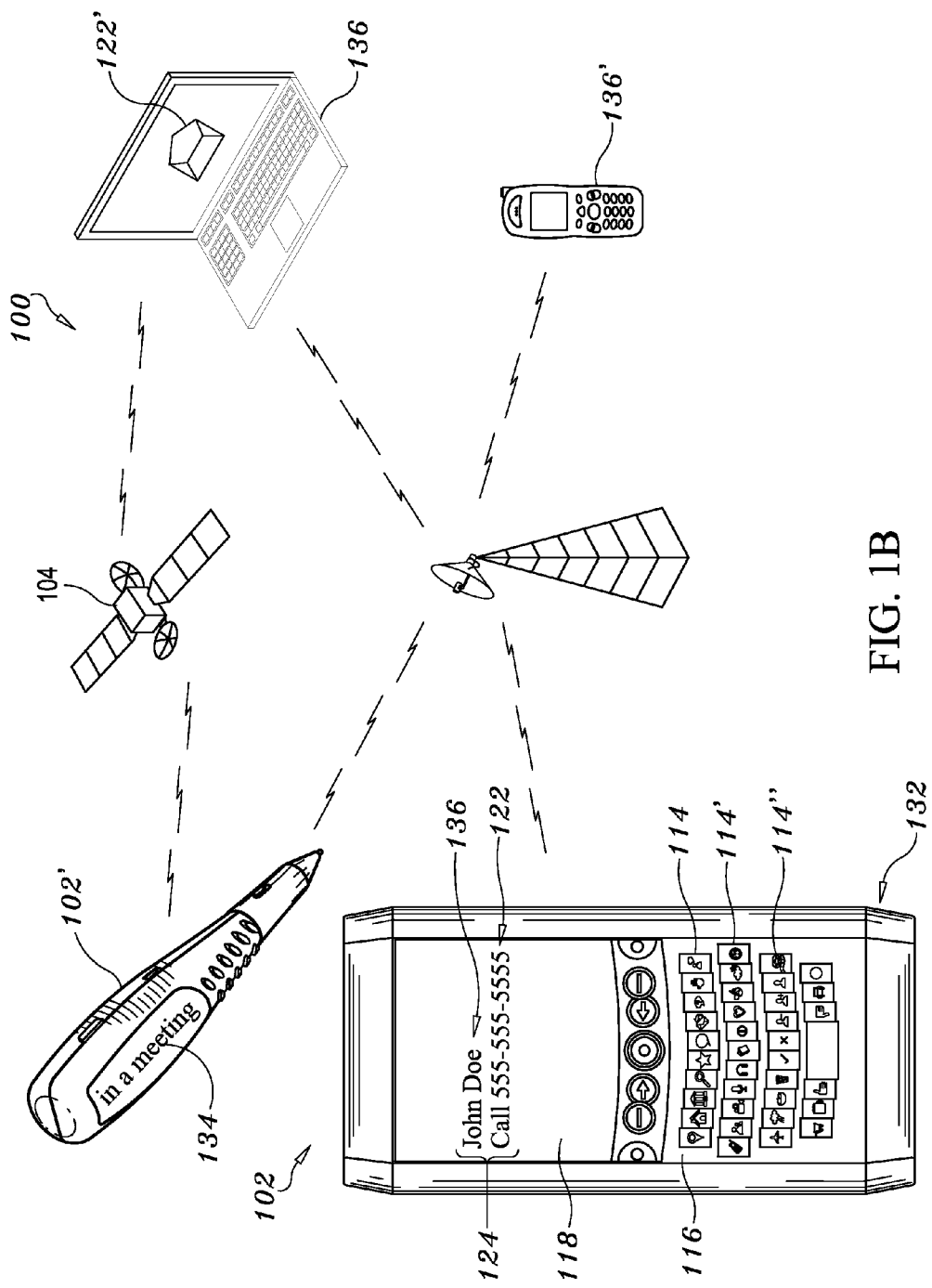

FIGS. 1A & 1B are exemplary embodiments of the system 100 according to one embodiment. System 100 comprises of at least one mobile communication device 102, 102' configured for communicating over a network 104 such as the Internet or a wireless communication network, which includes at least one computer processor 106 positioned within, in electronic communication with the at least one mobile communication device's communication means 108; a coded message application ("coded message app") program 110 comprising of computer executable instructions 112 readable by the at least one computer processor 106 and configured to perform any one or more of the following: display at least one icon 114 on a virtual touch-screen keyboard 116 (as are well known and used in the arts) on the mobile communication device's at least one displaying means 118, wherein the at least one icon 114 corresponds to at least one coded message 120 available for transmission to at least one or more electronic addresses 122, 122' via the at least one mobile communication device's communication means 108; receive selection of the at least one icon 114 for transmission to the electronic addresses 122, 122'; convert the selected at least one icon 114 to a coded message 120; display the converted icon's coded message 120 on the at least one displaying means 118; receive selection of the at least one or more electronic addresses 122, 122'; transmit the coded message 120 to the at least one or more electronic addresses 122, 122'; display confirmation of transmission of the coded message 120; launch the coded message app 110 for transmitting coded messages 120, 120' to at least one or more electronic addresses 122, 122'; receive and publish notification of an incoming communication 124 from a sender's electronic address 122 on the mobile communication device's displaying means 118; receive selection of an icon 114 for calendaring a response to the incoming communication 124; capture the sender's electronic address 122, generate and store a reminder message 128 for the response that was calendared; publish the reminder message 128 on the mobile communication device's displaying means 118 at predetermined intervals unless one or more alternate instructions 130, 130 are received; receive a request to edit the coded message that corresponds to the selected at least one icon; replace a display 132 of a virtual keyboard 116 on the mobile communication device's displaying means 118 that comprises of at least one or more icons 114, 114, with a display of a virtual keyboard 116 with alphanumeric characters 134, e.g. QWERTY alphanumeric keyboard; receive at least one edit to the converted coded message 120; store the at least one edit for the converted coded message 120 for the corresponding icon 114 for current and/or future use; or display an electronic address 122 for at least one or more electronic addresses 122, 122' of the at least one coded message 120. Electronic addresses 122, 122' as used herein may include any one or more of the following: name, telephone number, email address and social network electronic identifier, e.g. a TWITTER™ handler, and the like.

Mobile communication device 102 may be any type of computerized electronic device configured with means for communicating wirelessly and/or wired with other mobile communication devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 104, local area network, wide area network such as the Internet, or any other type of network device that may communicate over a network 104.

Computer processor 106 may be any type of processor, such as, but not limited to, a central processing unit (CPU), a microprocessor, a video processor, a front end processor, a coprocessor, a single-core computer processor, a multi-core processor, and the like. Computer processor 106 may be programmed to activate a coded message application ("coded message app") 110 for displaying at least one icon 114 on a virtual keyboard 116 on the mobile communication device's at least one displaying means 118, wherein the at least one icon 114 corresponds to at least one coded message 120 available for transmission to at least one or more electronic addresses 122, 122'. Processor 106 may also be programmed to solicit instructions from the user, e.g. request an electronic address 124 for one or more message recipients 136, 136 and/or other like instructions which may be displayed on the mobile communication's displaying means 118. In some embodiments, mobile communication device 102 also includes a speaker 138 (as is well known and used in the arts) for broadcasting in audio the coded message 120 being transmitted, edited or saved, or for broadcasting reminder messages 128, 128' at predetermined intervals unless one or more alternate instructions 130, 130 are received. Alternate instructions 130, 130' may comprise of any one or more of the following: okay, cancel, delete; and completed or the like.

In some embodiments, user may customize the predetermined intervals to select for example in Setup of the coded message app 110, time preferences (e.g. 5 minutes, 10 minutes, 15 minutes, etc.) for a reminder message 128 to be published (on the displaying means 118 via a text or broadcasted over the speaker 138) if the user elects to change his/her standard or current settings for the same.

In other embodiments, the reminder message 128 may continue publishing for the predetermined intervals until the system 100 detects that an electronic communication (e.g. a return call or text message) is transmitted to the electronic address 122 that is the subject of the calendared response 126 to the incoming communication 124. Practitioners of the art can appreciate that if multiple electronic addresses 122, 122' were identified in the incoming communication 124, the reminder message 128 may continue publication until the system 100 detects electronic communications transmitted to one, a plurality, or all electronic addresses 122, 122' as originally identified in the incoming communication 124.

Computer processor 106 positioned within the mobile communication device 102 includes computer executable instructions 112 readable and executable by the at least one computer processor 106, where the computer executable instructions 112 are configured to perform all the necessary functions for the system 100 and methods disclosed herein, including but not limited to launching the coded message app 110. Computer executable instructions 112 may be loaded directly on the mobile communication device's processor 106, or may be stored in its memory means 140 such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 112 may be any type of computer executable instructions 112, which may be in the form of a computer program, the program being composed in any suitable programming language or source code, such as C++, C, JAVA, JavaScript, HTML, XML, and other programming languages.

Computer executable instructions 112 are configured to perform any all the necessary functions for the system 100 and methods disclosed herein which may include any one or more of the following: display at least one icon 114 on a virtual touch-screen keyboard 116 on the mobile communication device's at least one displaying means 118, wherein the at least one icon 114 corresponds to at least one coded message 120 available for transmission to at least one or more electronic addresses 122, 122' via the at least one mobile communication device's communication means 108; receive selection of the at least one icon 114 for transmission to the electronic addresses 122, 122'; convert the selected at least one icon 114 to a coded message 120; display the converted icon's coded message 120 on the at least one displaying means 118; receive selection of the at least one or more electronic addresses 122, 122'; transmit the coded message 120 to the at least one or more electronic addresses 122, 122'; display confirmation of transmission of the coded message 120; launch the coded message app 110 for transmitting coded messages 120, 120' to at least one or more electronic addresses 122, 122'; receive and publish notification of an incoming communication 124 from a sender's electronic address 122 on the mobile communication device's displaying means 118; display at least one icon 114 on a virtual keyboard 116 comprising of icons 114, 114' on the mobile communication device's at least one displaying means 118, wherein at least one icon 114 corresponds to an option for calendaring a response 126; receive selection of an icon 114 for calendaring a response to the incoming communication 124; convert the selected at least one icon 114 into instructions for calendaring a response 126 to be displayed as a reminder message 128 on the mobile communication device's displaying means 118; capture the sender's electronic address 122, generate and store a reminder message 128 for the response that was calendared; publish the reminder message 128 on the mobile communication device's displaying means 118 at predetermined intervals unless one or more alternate instructions 130, 130 are received; receive a request to edit the coded message that corresponds to the selected at least one icon; replace a display 132 of a virtual keyboard 116 on the mobile communication device's displaying means 118 that comprises of at least one or more icons 114, 114, with a display of a virtual keyboard 116 with alphanumeric characters 134; receive at least one edit to the converted coded message 120; store the at least one edit for the converted coded message 120 for the corresponding icon 114 for current and/or future use; or display an electronic address 122 for at least one or more electronic addresses 122, 122' of the at least one coded message 120.

Memory means 140 may be either electrically or mechanically connected to the at least one computer processor 106. In the case of electronic connections, the electronic connections may be wired and/or wireless connections. Memory means 140 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 140 may be used to store information, such as coded message app 110, coded messages 120, 120', edits to the coded messages 120, 120', reminder messages 128, 128', electronic addresses 124, 124', alternate instructions 130, 130' and the like. Electronic addresses 124, 124' include, but are not limited to, name, address, telephone number, email address, internet protocol address and the like. Stored information may be retrieved from the at least one memory means 140 using the computer processor 106.

Mobile communication device 102 may include any kind of displaying means 118, such as, but not limited to: a liquid crystal display ("LCD") screen, a light emitting diode ("LED") display, touchpad or touch screen display, and/or any other means known in the arts for emitting a visually perceptible output. Displaying means 118 may include a control means, such as, but not limited to, a touch screen, a stylus, and the like. Mobile communication device's processor 106 is in electronic communication with its displaying means 118. In other embodiments, displaying means 118 is wirelessly connected to processor 106. In some embodiments, displaying means 118 may be electronically connected to a mobile communication device 102 or client device 102' according to the hardware and software protocols that are well known and used in the arts.

Mobile communication device's computer processor 106 controls its displaying means 118, which is configured for displaying at least one icon 114 on a virtual keyboard 116, wherein the at least one icon 114 corresponds to at least one coded message 120 available for transmission to at least one or more electronic addresses 122, 122'; displaying the converted icon's coded message 120; displaying one or more reminder messages 128, 128'; displaying confirmation of transmission of the coded message 120; displaying a virtual keyboard 116 comprising of a plurality of icons 114, 114' or alphanumeric characters 134, 134', e.g. QWERTY alphanumeric keyboard; and/or displaying one or more electronic addresses 124, 124' for receipt of the coded messages 120, 120' or response 126, i.e. return calls, texts or emails, TWEETS™, and the like.

Mobile communication device 102 may include other hardware components, e.g. one or more communication means 108, either electrically or mechanically connected to its computer processor 106. In the case of electronic connections, the electronic connections may be wired and/or wireless. In some embodiments, communication means 108 may be a wireless communication means 108, which employ short range wireless protocol, such as, but not limited to, a radio frequency transceiver, a radio frequency receiver, and/or a radio frequency transmitter. In embodiments where the wireless communication means 108 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 108 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 108 are operative to transmit or receive electronic communications, i.e. coded messages 120, 120', audio, data, text, pictures, and the like via a short range wireless protocol, such as, but not limited to, a radio frequency receiver, a radio frequency transmitter, or a radio frequency transceiver.

In some embodiments, mobile communication device 102 may have one or more icons 114, 114' or other visual indicators displayed thereon that allows user to launch and access the coded message app 110. When a user selects the launch icon 114 (e.g. by touching a touchscreen, or selecting it using a pointing device, roller ball, arrow keys, or other controller), the user may access the coded message app 110.

System 100 also includes software component, i.e. a coded message app 110, which may comprise in part of a browser, such as for use on the mobile communication device 102, or a similar browsing device to transmit coded messages 120, 120' to one or more electronic addresses 122, 122' for one or a plurality of message recipients 136, 136'. The app 110 may be any type of software application, such as a standalone application designed to run on a mobile platform, such as a mobile communication device running an operating system, such as iOS™, Android™, Windows Mobile™, Blackberry™, and the like. Coded message app 110 may be operative for an iPhone, any other "smart phone," mobile communication device, cellular phone, PDA, GPS or any other mobile communication device 102 capable of handling transactions dealing with dynamic content, object, application, or software. In another embodiment, the app 110 may be designed to run on a social network platform, such as FACEBOOK™ or JUSTSYNC™.

In some embodiments, a coded message app 110 may reside on a server and/or on a mobile communication device 102 or client device 102', where the server computer 106 may have a software program residing in memory. A client device 102' may have the coded message app 110 residing in local memory or the coded message app 110 maybe downloadable to the client device 102' from the server. For example, in one embodiment, the coded message app 110 may be on a mobile communication device (such as an iPhone, Blackberry, or other 'smart phone') and the full-sized software program may be on a computer, where communications may occur over a network or directly, either wired or wirelessly.

FIGS. 1B-1C are exemplary embodiments of the system 100 according to one embodiment. In some embodiments, once an incoming communication 124 is detected by the mobile communications device's processor 106, the coded message app 110 is automatically launched and triggers the display of a virtual keyboard 116 of varied icons 114, 114', 114" representative of coded messages 120, 120' available for transmission to varied electronic addresses 122, 122', including but not limited to the original sender of the electronic incoming communication 124 as seen in FIG. 1B. As shown, the incoming communication 124 is published via a display 132 on the mobile communications displaying means 118 including the icons 114, 114', 114" for the associated coded messages 120, 120' for transmission to message recipients 136, 136'. The coded messages 120, 120' may be the standard coded messages 120, 120' as included with the app 110 or user customized where the original coded message 120 associated with an icon 114 can be edited for a customized coded message 120 and stored for future use in the mobile communications device's memory means 140. For example, as seen in FIG. 1C, listed are several icons 114, 114', 114" and their corresponding coded messages 120, 120', 120" where a student user may for instance customize the icon 114 representative of coded message for "AT WORK" to mean "AT SCHOOL." By saving the edits and storing the changes, user may use the stored customized icon 114 in the future to notify his/her message recipients 136, 136' that he or she is AT SCHOOL. By simply clicking the icon 114 as modified for "AT SCHOOL," processor 106 converts the selected at least one icon 114 to a coded message 120 that may be displayed on the displaying means 118 for transmission to one or a plurality of message recipients 136, 136.'

Similarly, the coded message 120 may be customized to reflect a language or dialect of the user's choice. In this manner, by user can maintain privacy over the coded messages 120 being transmitted as the language or dialect being used only requires the message recipient's 136 understanding of the same.

Figure 2A:
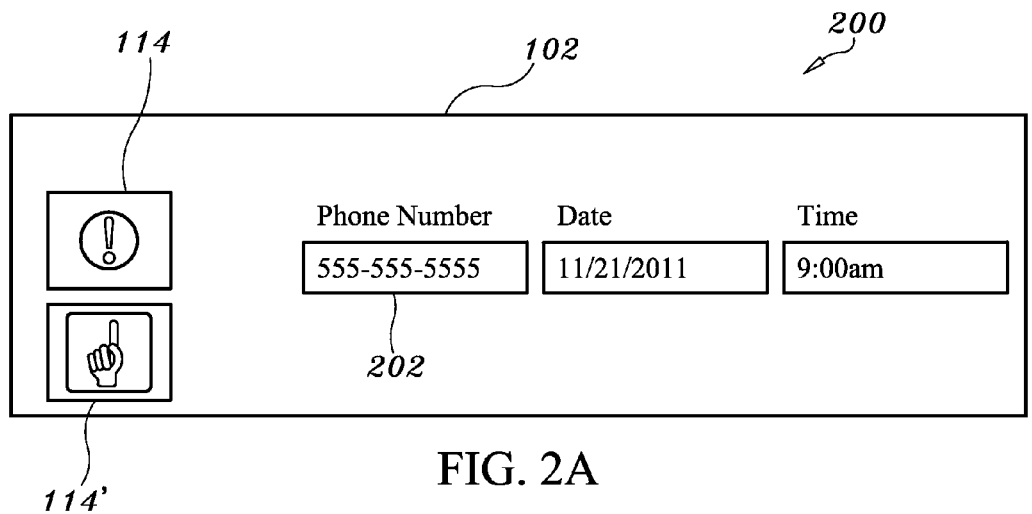
FIG. 2A shows exemplary icons for calendaring a response as displayed on a mobile communication device.
Figure 2B:
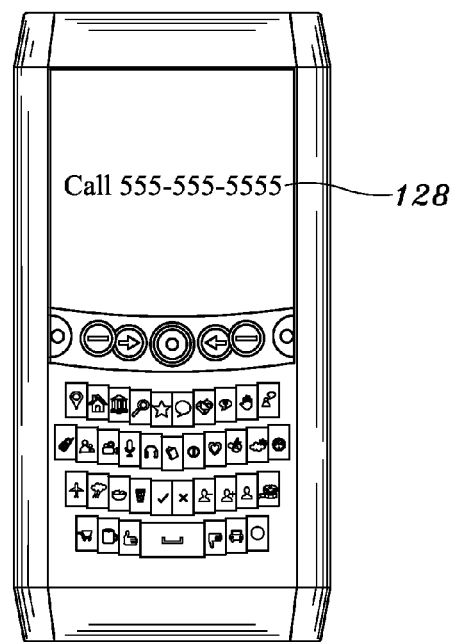
FIG. 2B shows a reminder message pursuant to a calendared response according to one embodiment.

FIGS. 2A & 2B show exemplary icons 114, 114' on a mobile communication device 102 for calendaring a response 126 with a level of urgency (icon 114) based on an incoming communication 124 from a sender's electronic address 122 and a calendared response 126. For example, if a sender initiates an incoming communication 124, e.g. a text message or telephone call to user, processor 106 receives the incoming communication 124 and publishes by text or audio, notification of the incoming communication 124 on a mobile communication device 102. In the exemplary embodiment, the incoming communication 124 is published via a display on the mobile communication device's displaying means 118, e.g. by text message or phone number 202 (for incoming voice communications). User has the option to select the icon 114 (e.g., by touching a touchscreen, or selecting it using a pointing device, roller ball, arrow keys, or other controller) for calendaring a reminder message 128 to be published at predetermined intervals.

Methods

Figure 3:
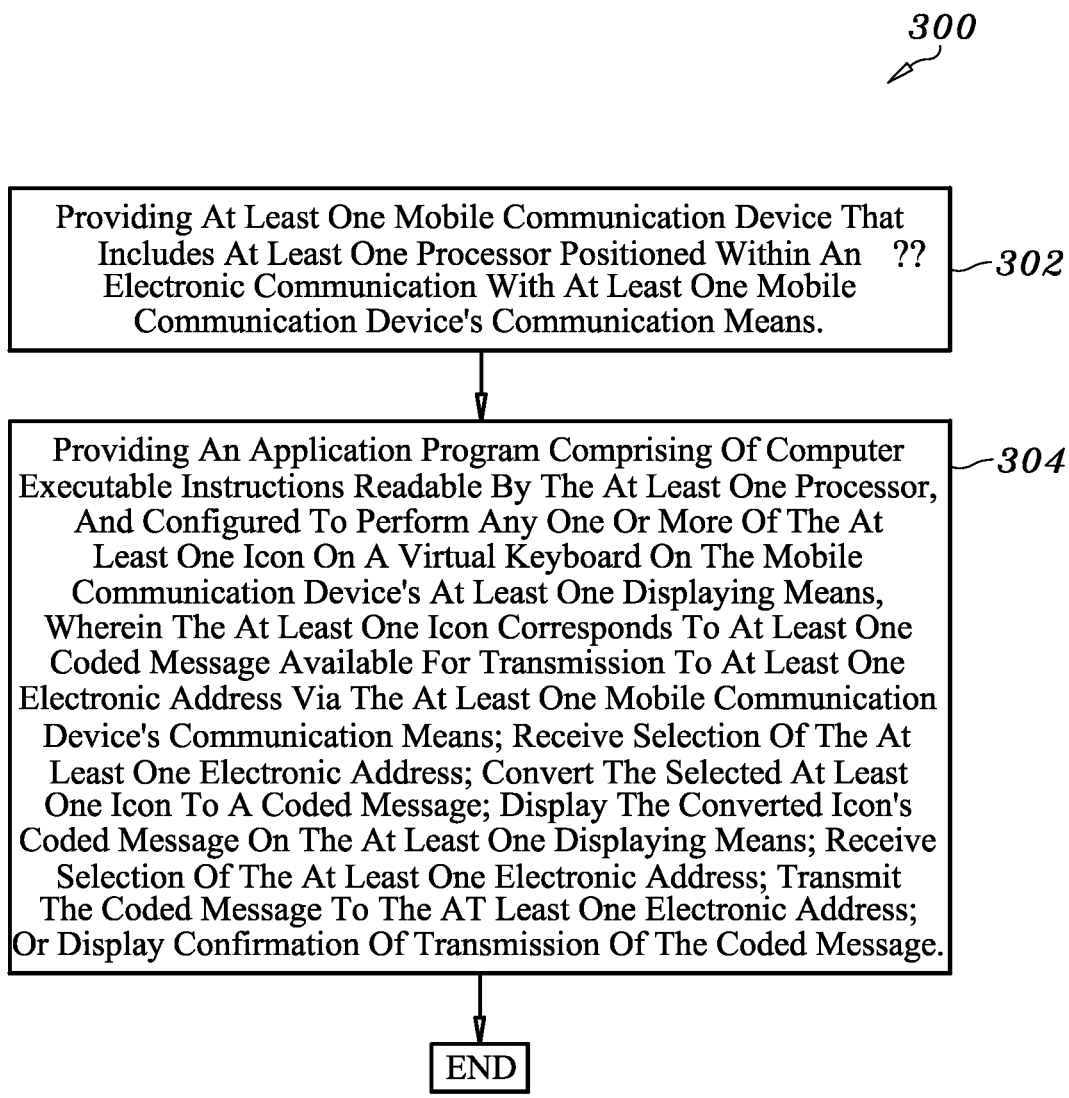
FIG. 3 is a sample flowchart of block diagram of an exemplary method according to one embodiment of the invention.

FIG. 3 is a sample flowchart of a block diagram of an exemplary method 300 according to one embodiment of the invention. Method 300 comprises of: providing at least one mobile communication device 102 that includes at least one processor 106 positioned within in electronic communication with at least one mobile communication device's communication means 108 (step 302). Mobile communication device 102 may include at least one displaying means 118, which includes but is not limited to: a LCD screen, a LED screen, or a monitor and the like. As previously discussed, computer processor 106 may be any type of processor, such as, but not limited to, a central processing unit (CPU), a microprocessor, a video processor, a front end processor, a coprocessor, a single-core computer processor, a multi-core processor, and the like.

Method 300 further comprises of providing a coded message application program 110 comprising of computer executable instructions 112 readable by the at least one processor 106, and configured to perform any one or more of the following: display at least one icon 114 on a virtual keyboard 116 on the mobile communication device's at least one displaying means 118, wherein the at least one icon 114 corresponds to at least one coded message 120 available for transmission to at least one electronic address 122, 122' via the at least one mobile communication device's communication means 108; receive selection of the at least one icon 114 for transmission to the at least one or more electronic address 122, 122'; convert the selected at least one icon 114 to a coded message 120; display the converted icon's coded message 120 on the at least one displaying means 118; receive selection of the at least one or more electronic address 122, 122'; transmit the coded message 120 to the at least one or more electronic address 122, 122'; or display confirmation of transmission of the coded message 120 (step 304). The mobile device's at least one communications means 108 is configured for accessing a data network 104 and transmitting electronically voice or data communications.

Processor 106 is further configured to launch the coded message application 110 for transmitting coded messages 120 to the at least one electronic address 122, 122' either automatically upon receipt of a detected incoming communication 124 or via an affirmative selection of an icon 114 on the mobile device's displaying means 118.

Figure 4:
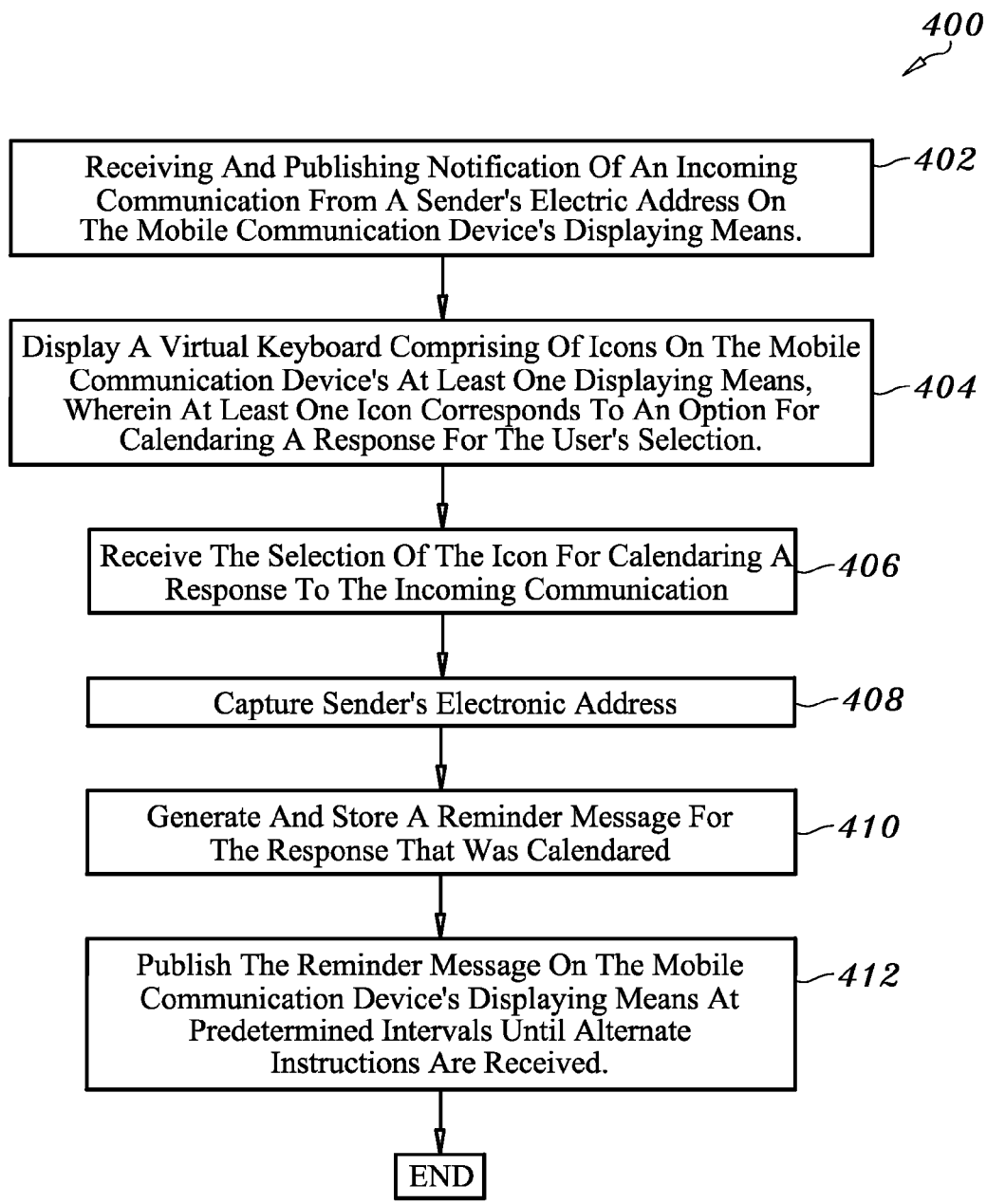
FIG. 4 describes a sample flowchart of a block diagram of an exemplary method of calendaring a response.

FIG. 4 describes a sample flowchart of a block diagram of an exemplary method 400 of calendaring a response 126. Method 400 comprises of receiving and publishing notification of an incoming communication 124 from a sender's electronic address 122 on the mobile communication device's displaying means 118 (step 402). User may choose to respond to the incoming communication 124 (text, email, incoming call social network communications, and the like) in any manner deemed appropriate including but not limited to sending a coded message 120 to the sender and or other message recipients 136, 136'. The incoming communication 124 may automatically trigger the launch of the coded message app 110 or upon publication of the incoming communication 124 in audio or text on the displaying means 118, the user may elect to launch the coded message app 110 for transmission of a coded message 120.

As such, the app's computer executable instructions 112 readable by the at least one processor 106, is configured to display a virtual keyboard 116 comprising of icons 114, 114' on the mobile communication device's at least one displaying means 118, wherein at least one icon 114 corresponds to an option for calendaring a response 126 (step 404) for the user's selection.

The coded message app's computer executable instructions 112 receive the selection of the icon 114 for calendaring a response 126 to the incoming communication 124 (step 406); capture the sender's electronic address 122 (step 408); generate and store a reminder message 128 for the response 126 that was calendared (step 410). For example, user receives an incoming call from a known caller, e.g. an employer, user may select the appropriate icon 114 for calendaring a return call. In that manner, app 110 displays a reminder message 128 at predetermined intervals reminding user of the return call needed until the predetermined intervals have expired or some other event, for instance user returns the phone call.

Method further comprises of publishing the reminder message 128 on the mobile communication device's displaying means 118 at predetermined intervals until alternate instructions 130, 130' are received (step 412). Alternate instructions 130, 130' as used herein may include but is not limited to any one or more of the following: okay, cancel, delete, completed or the like. The predetermined intervals are customizable for the user's preferences (e.g. 5 minutes, 10 minutes, 15 minutes, 30 minutes, an hour, etc.) for a reminder message 128 to be published (on the displaying means 118 via a text or broadcasted over the speaker 138) if the user elects to change his/her standard or current settings for the same.

Figure 5:
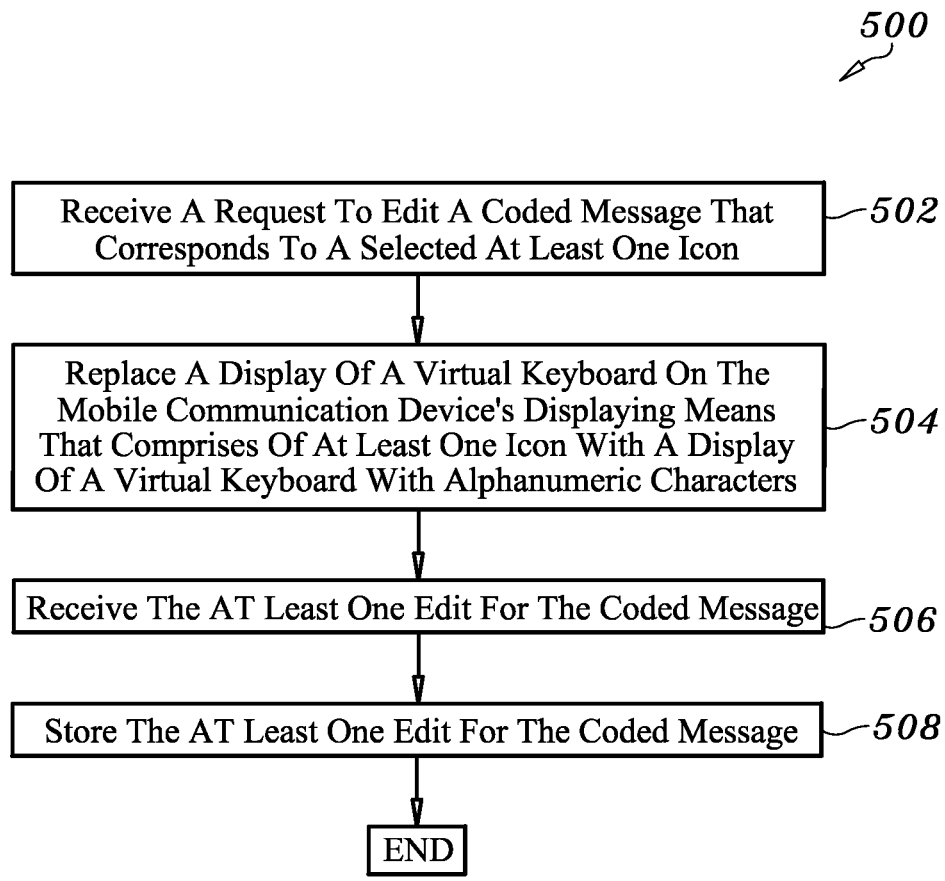
FIG. 5 describes a sample flowchart of a block diagram of an exemplary method of editing at least one coded message according to one embodiment.

FIG. 5 describes a sample flowchart of a block diagram of an exemplary method 500 of editing at least one coded message 120 according to one embodiment. In some embodiments, user may modify one or a plurality of coded messages 120, 120' associated with an icon 114 when using the app 110. The exemplary method 500 comprises of receiving a request to edit a coded message 120 that corresponds to a selected at least one icon 114 (step 502); replacing a display 132 of a virtual keyboard 116 on the mobile communication device's displaying means 118 that comprises of at least one icon 114 with a display of a virtual keyboard 116 with alphanumeric characters 134, 134' (step 504). Once the alphanumeric characters 134, 134' are displayed, user may edit the at least one coded message 120 to a more relevant description. Accordingly, the app's computer executable instructions 112 readable by the at least one processor 106 receives at least one edit to the coded message 120 (step 506); and stores the at least one edit for the coded message for future use (step 508). Once the edits are completed, user has the option of continuing to edit or to transmit the edited or another coded message 120 to one or more electronic addresses 122, 122' for one or a plurality of message recipients.

Figure 6:
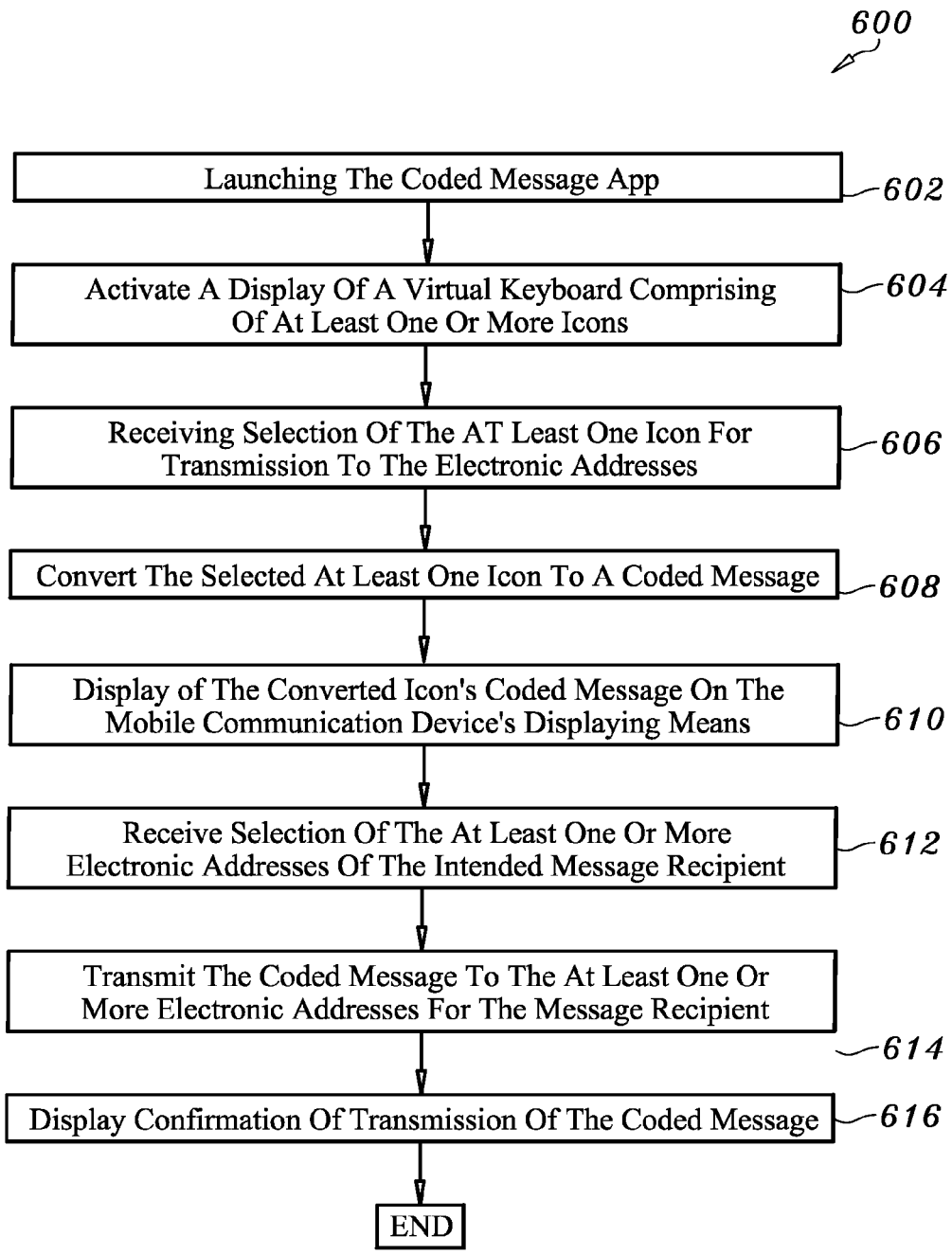
FIG. 6 describes a sample flowchart of a block diagram of an exemplary method of transmitting at least one coded message according to another embodiment.

FIG. 6 describes a sample flowchart of a block diagram of an exemplary method 600 of transmitting at least one coded message 120 according to another embodiment. Method 600 comprises of launching the coded message app 110 (step 602) either automatically because of an incoming communication 124 or by an selection by user. In either embodiment, once launched, the app's computer executable instructions 112 readable by the at least one processor 106, is configured to activate a display 132 on the at mobile communication device's at least one displaying means of a virtual keyboard 116, e.g. a touchscreen, comprising of at least one or more icons 114, 114' (step 604) each corresponding to at least one coded message 120 available for transmission to at least one or a plurality of electronic address 122, 122'.

Method 600 further comprises of receiving selection of the at least one icon 114 for transmission to the electronic addresses 122, 122' (step 606); convert the selected at least one icon 114 to a coded message 120 (step 608) e.g. if the user selected the at least one icon 114 representative for coded message 120 "I'm Driving," the icon 114 would be converted and processor 106 causes the display of the converted icon's coded message 120 on the mobile communication device's displaying means 118 (step 610); receive selection of the at least one or more electronic addresses 122, 122' (step 612) of the intended message recipients 136, 136'; transmit the coded message 120 to the at least one or more electronic addresses 122, 122' (step 612) for the message recipients 136, 136'; and display confirmation of transmission of the coded message 120 (step 614).

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods 300-700 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
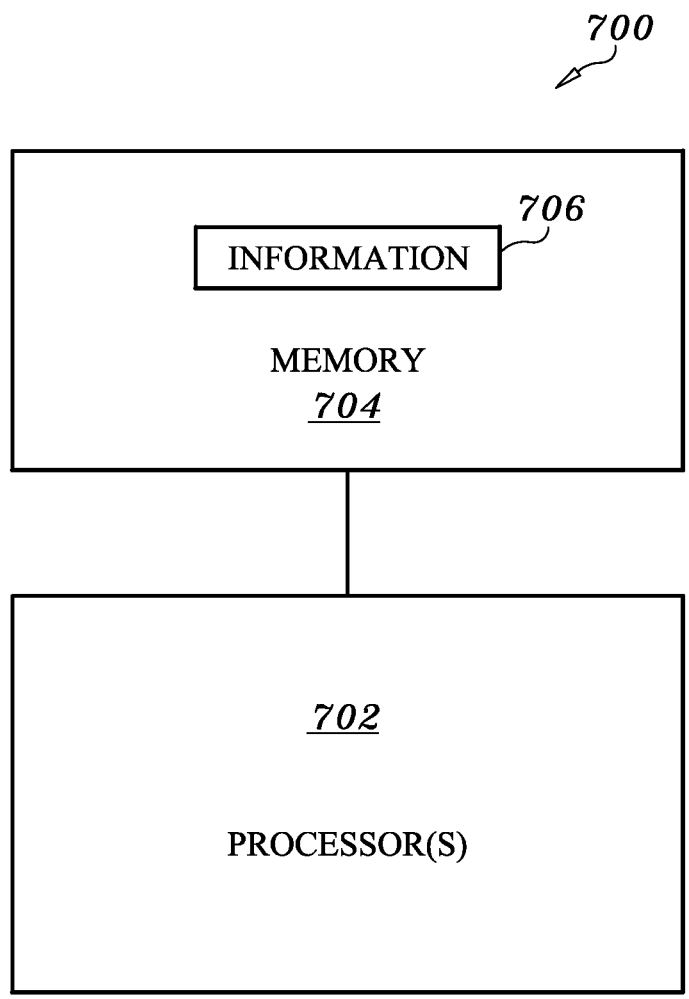
FIG. 7 is a block diagram representing an apparatus according to various embodiments.

FIG. 7 is a block diagram representing an apparatus 700 according to various embodiments. Such embodiments may comprise a computer, a memory system, a magnetic or optical disk, some other storage device, or any type of electronic device or system. The apparatus 700 may include one or more processor(s) 704 coupled to a machine-accessible medium such as a memory 702 (e.g., a memory including electrical, optical, or electromagnetic elements). The medium may contain associated information 704 (e.g., computer program instructions, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for transmitting at least one coded message and calendaring responses comprising of:
   at least one mobile communication device in electronic communication with communication means of the at least one mobile communication device;
   a coded message application resident on the at least one mobile communication device, the coded message application comprising of computer executable instructions readable by at least one processor, and that performs the following:

displays, on a display of the at least one mobile communication device, a virtual keyboard comprising a plurality of icons for composing at least one coded message, wherein each icon represents at least one coded message available for transmission to at least one electronic address via the at least one mobile communication device's communication means;

receives selection of at least one icon for transmission to the at least one electronic address;

converts the selected at least one icon to a coded message;

displays the converted icon's coded message on the display;

receives selection of the at least one electronic address;

transmits the coded message to the at least one electronic address;

displays confirmation of transmission of the coded message; and a calendaring module, in communication with the at least one mobile communication device and the coded message application, the calendaring module comprising of the at least one processor, the at least one mobile communication device's display, and memory, wherein the module is configured to calendar a response to an incoming communication to the at least one mobile communication device.

2. The system of claim 1, wherein the computer executable instructions readable by the computer processor are further operative to launch the coded message application for transmitting coded messages to the at least one electronic address.

3. The system of claim 1, wherein the at least one electronic address may include any one or more of the following: name, telephone number, email address and social network electronic identifier.

4. The system of claim 1, wherein the at least one communications means is configured for accessing a data network and transmitting electronically voice or data communications.

5. The system of claim 1, wherein the calendaring module, by the at least one processor's execution of the computer executable instructions of the coded message application is further configured to perform any one or more of the following:

receive and publish notification of the incoming communication from a sender's electronic address on the mobile communication device's display;

receive selection of an icon for calendaring a response to the incoming communication;

capture the sender's electronic address and generate and store a reminder message for the response that was calendared; or publish the reminder message on the mobile communication device's display at predetermined intervals unless alternate instructions are received.

6. The system of claim 5, wherein alternate instructions may comprise of any one or more of the following: okay, cancel, delete; and completed.

7. The system of claim 1, wherein the computer executable instructions readable by the at least one processor are further configured to perform any one or more of the following:

receive a request to edit the coded message that corresponds to the selected at least one icon;

replace a display of a virtual keyboard on the mobile communication device's displaying means that comprises of at least one icon with a virtual display of a keyboard with alphanumeric characters;

receive at least one edit to the converted coded message;

store the at least one edit for the converted coded message; or display an electronic address for at least one electronic address of the at least one coded message.

8. A method of transmitting coded messages and calendaring responses comprising the steps of:

enabling connection of at least one mobile communication device with at least one communication means;

enabling operation of a non-transitory application program comprising of computer executable instructions readable by at least one processor, the application program performing the following:

displaying on the mobile communication device's at least one display, a virtual keyboard comprising a plurality of icons for composing at least one coded message, wherein each icon represents at least one coded message available for transmission to at least one electronic address via the at least one mobile communication device's communication means;

receiving selection of at least one icon for transmission to the at least one electronic address;

converting the selected at least one icon to a coded message;

displaying the converted icon's coded message on the at least one display;

receiving selection of the at least one electronic address;

transmitting the coded message to the at least one electronic address;

displaying confirmation of transmission of the coded message; and enabling operation of a calendaring module, in communication with the at least one mobile communication device and the application program, the calendaring module comprising of the at least one processor, a display of the at least one mobile communication device, and memory, wherein the module is configured to calendar a response to an incoming communication to the at least one mobile communication device.

9. The method of claim 8, further comprising launching a coded message application for transmitting coded messages to the at least one electronic address.

10. The method of claim 8, wherein the at least one electronic address may include any one or more of the following: name, telephone number, email address and social network electronic identifier.

11. The method of claim 8, wherein the at least one communications means is configured for accessing a data network and transmitting electronically voice or data communications.

12. The method of claim 8, further comprising any one or more of the following:

receiving and publishing notification of the incoming communication from a sender's electronic address on the mobile communication device's display;

receiving selection of an icon for calendaring a response to the incoming communication;

capturing the sender's electronic address and generating a reminder message for the response that was calendared; or publishing the reminder message on the mobile communication device's displaying means at predetermined intervals until alternate instructions are received.

13. The method of claim 12, wherein alternate instructions may comprise of any one or more of the following: okay, cancel, delete; and completed.

14. The method of claim 8, further comprising any one or more of the following:
- receiving a request to edit the coded message that corresponds to the selected at least one icon;
- replacing a display of a virtual keyboard on the mobile communication device's displaying means that comprises of at least one icon with a virtual display of a keyboard with alphanumeric characters;
- receiving at least one edit to the coded message;
- storing the at least one edit for the coded message; or
- displaying an electronic address for at least one electronic address of the at least one coded message.

15. A method of transmitting coded messages and calendaring responses comprising the steps of:
- automatically launching a non-transitory application program upon detection of an incoming communication to a mobile communication device, wherein the detection is by a processor of the mobile communication device;
- the application program performing the following:
    - triggering the display of a virtual keyboard, on a display of the mobile communication device, wherein the virtual keyboard comprises a plurality of icons for composing at least one coded message, wherein each icon represents at least one coded message available for transmission to at least one electronic address;
    - receiving selection of at least one icon for transmission to at least one electronic address;
    - converting the selected at least one icon to a coded message;
    - displaying the converted icon's coded message on the mobile communication device's display;
    - receiving selection of the at least one electronic address of an intended message recipient;
    - transmitting the coded message to the at least one electronic address for the message recipient;
    - displaying confirmation of transmission of the coded message; and
- enabling operation of a calendaring module, in communication with the at least one mobile communication device and the application program, the calendaring module comprising of the at least one processor, a display of the at least one mobile communication device, and memory, wherein the module is configured to calendar a response to an incoming communication to the at least one mobile communication device.

16. The method of claim 15, further comprising publishing notification of incoming communication from a sender's electronic address.

17. The method of claim 15, further comprising receiving selection of at least one electronic address other than the sender's electronic address.

18. A system of communicating comprising of:
- a mobile communication device that includes at least one processor positioned within in electronic communication with at least one mobile communication device's communication means;
- a non-transitory application program comprising of computer executable instructions readable by the at least one processor, and performing the following:
    - automatically launching the application program upon detection of an incoming communication to the mobile phone, wherein the detection is by the at least one processor;
    - triggering the display of a virtual keyboard, on a display of the mobile communication device, wherein the virtual keyboard comprises a plurality of icons for composing at least one coded message, wherein each icon represents at least one coded message available for transmission to at least one electronic address;
    - receiving selection of at least one icon for transmission to at least one electronic address;
    - converting the selected at least one icon to a coded message;
    - displaying the converted icon's coded message on the mobile communication device's display;
    - receiving selection of the at least one electronic address of an intended message recipient;
    - transmitting the coded message to the at least one electronic address for the message recipient;
    - displaying confirmation of transmission of the coded message; and
- a calendaring module, in communication with the at least one mobile communication device and the application program, the calendaring module comprising of the at least one processor, the at least one mobile communication device's display, and memory, wherein the module is configured to calendar a response to an incoming communication to the at least one mobile communication device.

19. The system of claim 18, further comprising publishing notification of incoming communication from a sender's electronic address.

20. The system of claim 18, further comprising receiving selection of at least one electronic address other than the sender's electronic address.

* * * * *